US 8,599,508 B1

(12) United States Patent
Burd

(10) Patent No.: US 8,599,508 B1
(45) Date of Patent: Dec. 3, 2013

(54) METHOD AND SYSTEM FOR COMPENSATING FOR ADJACENT TRACKS DURING READING OF DATA

(75) Inventor: Gregory Burd, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 54 days.

(21) Appl. No.: 13/372,759

(22) Filed: Feb. 14, 2012

Related U.S. Application Data

(63) Continuation-in-part of application No. 13/082,018, filed on Apr. 7, 2011.

(60) Provisional application No. 61/445,444, filed on Feb. 22, 2011, provisional application No. 61/322,253, filed on Apr. 8, 2010.

(51) Int. Cl.
*G11B 5/584* (2006.01)

(52) U.S. Cl.
USPC .............................................. 360/39; 360/75

(58) Field of Classification Search
USPC ......... 369/47.1, 47.27, 44.37; 360/39, 46, 65, 360/77.14, 64, 73.08, 77.13, 73.04, 73.07
See application file for complete search history.

(56) References Cited

U.S. PATENT DOCUMENTS

| | | | |
|---|---|---|---|
| 6,697,209 B2 * | 2/2004 | Hughes et al. | 360/77.14 |
| 6,724,702 B2 | 4/2004 | Taguchi et al. | |
| 7,126,890 B2 | 10/2006 | Learned et al. | |
| 7,218,665 B2 | 5/2007 | McElwain | |
| 8,139,301 B1 | 3/2012 | Li et al. | |
| 8,259,409 B2 | 9/2012 | Braganca et al. | |
| 8,300,339 B1 * | 10/2012 | Nangare et al. | 360/39 |
| 2003/0218955 A1 | 11/2003 | Isshiki et al. | |

* cited by examiner

*Primary Examiner* — Nabil Hindi

(57) ABSTRACT

A method for sampling a current track and an adjacent track of a storage medium includes using a first read head to read a first data stream from the current track, using a second read head to read a second data stream from the adjacent track, delaying one of the first and second data streams to account for a position difference between the first and second read heads, and controlling sampling of the first and second data streams to align the first and second data streams. Controlling the sampling may include applying a synchronous sampling signal to control the first and second read heads so that they sample at synchronous locations, or may include sampling the current and adjacent data tracks at asynchronous locations and interpolating the first and second data streams to provide aligned samples. A storage device may operate in accordance with the method.

20 Claims, 6 Drawing Sheets

METHOD AND SYSTEM FOR COMPENSATING FOR ADJACENT TRACKS DURING READING OF DATA

CROSS REFERENCE TO RELATED APPLICATIONS

This disclosure claims the benefit of commonly-assigned U.S. Provisional Patent Application No. 61/445,444, filed Feb. 22, 2011, and is a continuation-in-part of copending commonly-assigned U.S. patent application Ser. No. 13/082,018, filed Apr. 7, 2011, which claims the benefit of commonly-assigned U.S. Provisional Patent Application No. 61/322,253, filed Apr. 8, 2010. Each of the aforementioned applications is hereby incorporated by reference herein in its respective entirety.

FIELD OF USE

This disclosure relates to a method and system for reading data that has been recorded in an arrangement of tracks on a storage medium and is read by a read head that moves relative to the surface of the storage medium. More particularly, this disclosure relates to compensating, during a read operation, for interference from an adjacent track or tracks that contributes to the read signal.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

In magnetic recording, as one example of a type of recording in which reading and writing are performed by a head that moves relative to the surface of the storage medium, data may be written in circular tracks on a magnetic disk. In known magnetic recording systems, track pitch is limited by the write head width. The read head is designed to be narrower than the write head so that reading can occur without picking up signals from any adjacent track. In addition, guard bands—empty bands on either side of each track—are provided to help prevent cases where data on one track are overwritten during writing of an adjacent track because of write head positioning errors.

In order to increase recording densities, it is desirable to shrink the track pitch and reduce or remove the guard bands between the tracks, which allows more tracks to fit on the recording medium. For example, in "Shingle Write Recording," also known as "Shingled Magnetic Recording," the tracks are written so that one track partially overlaps the previous track. In such a system, track pitch theoretically may be arbitrarily small. In practice, in a Shingled Magnetic Recording system, the track pitch is limited by the read head width. If track pitch is narrower than the read head width, then the read head may pick up a significant amount of signals from one or more adjacent tracks, leading to low data reliability.

In order to further reduce the track pitch beyond the read head width, it is necessary to mitigate the interference picked up from adjacent tracks during a read operation. If the component of the adjacent track picked up by the read head is sufficiently small, it may be possible to use knowledge of the data written on the adjacent track to carry out ITI cancellation.

Copending, commonly-assigned U.S. patent application Ser. No. 12/882,802, filed Sep. 15, 2010 and hereby incorporated by reference herein in its entirety, describes a method and system for compensating for ITI by using actual or estimated data from the adjacent track.

SUMMARY

In accordance with one embodiment, there is provided a method for sampling a current track of a storage medium and an adjacent track of the storage medium includes using a first read head to read a first data stream from the current track, using a second read head to read a second data stream from the adjacent track, delaying one of the first data stream and the second data stream to account for a position difference between the first read head and the second read head, and controlling sampling of the first data stream and the second data stream to align the first data stream and the second data stream.

In accordance with another embodiment, in the foregoing method, controlling sampling includes applying a synchronous sampling signal to control the first read head and the second read head so that they sample at synchronous locations in their respective data streams.

In accordance with a third embodiment, in the foregoing method, controlling sampling includes sampling the current track with the first read head, and the adjacent track with the second read head, at asynchronous locations to provide the first and second data streams. and interpolating the first data stream and the second data stream to provide aligned samples of the first and second data streams.

In accordance with a fourth embodiment, in the foregoing method, controlling timing includes applying a timing signal to control sampling by the first read head to provide the first data stream, sampling the adjacent track with the second read head, at sampling locations asynchronous to the first read head, to provide the second data stream, and interpolating the second data stream under control of the timing signal to provide samples of the second data stream aligned with samples of the first data stream.

In accordance with a fifth embodiment, a storage device includes a first read head that reads a first data stream from a current track of a storage medium, a second read head that reads a second data stream from an adjacent track of the storage medium, and a decoder that delays one of the first data stream and the second data stream to account for a position difference between the first read head and the second read head, and controls sampling of the first data stream and the second data stream to align the first data stream and the second data stream.

In accordance with a sixth embodiment, the decoder controls the sampling by applying a synchronous sampling signal to control the first read head and the second read head so that they sample at synchronous locations in their respective data streams.

In accordance with a seventh embodiment, the decoder controls the sampling by sampling the current track with the first read head, and the adjacent track with the second read head, at asynchronous locations to provide the first and second data streams, and interpolating the first data stream and the second data stream to provide aligned samples of the first and second data streams.

In accordance with an eighth embodiment, the decoder controls timing by applying a timing signal to control sampling by the first read head to provide the first data stream, sampling the adjacent track with the second read head, at sampling locations asynchronous to the first read head, to provide the second data stream, interpolating the second data stream under control of the timing signal to provide samples of the second data stream aligned with samples of the first data stream.

In accordance with a ninth embodiment, a method of controlling read head position in a storage device having a plurality of read heads includes deriving a first parameter from a first read head that reads a first track of a plurality of tracks, deriving a second parameter from a second read head that reads a second track of the plurality of tracks, and controlling position of at least one of the read heads to achieve a desired relationship of the first and second parameters.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

This disclosure is a method and system for factoring out adjacent-track signals from a data storage read-back signal to recover a clear main-track data signal, particularly where the adjacent track signals result from ITI in a case of Shingled Magnetic Recording, Two-Dimensional Magnetic Recording (TDMR) or other small-track-pitch recording techniques.

Figure 1:
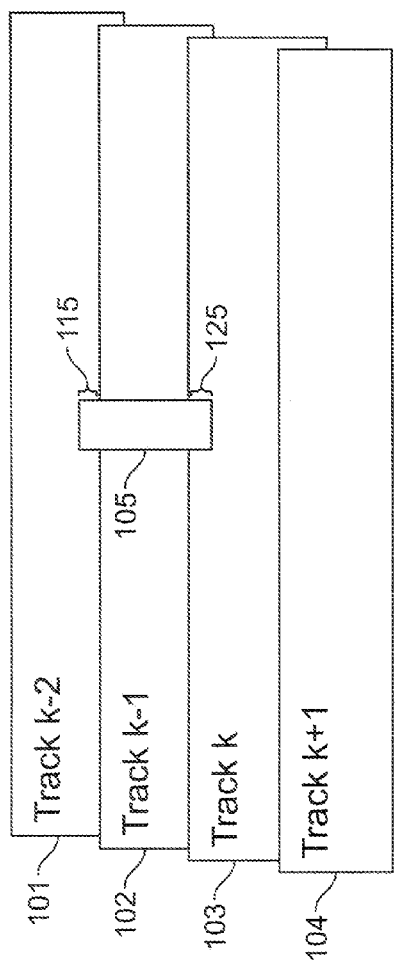
FIG. 1 is a simplified schematic view of four shingled data tracks with a read head, with which the disclosure may be used.
Figure 2:
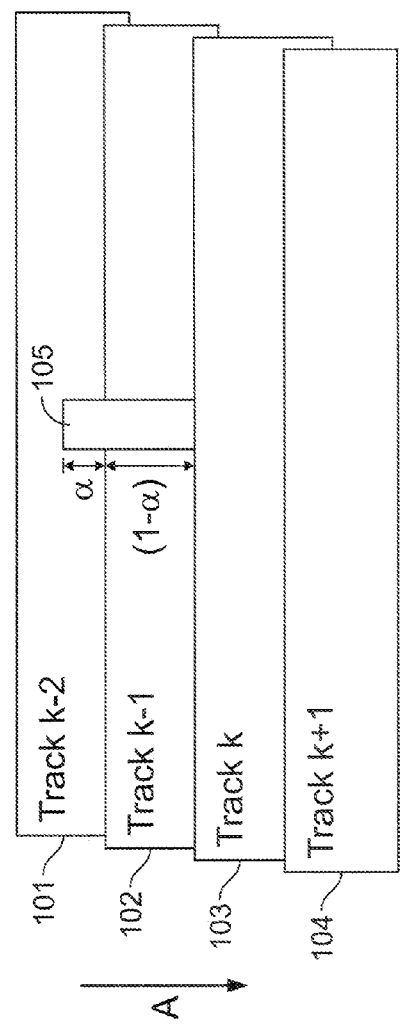
FIG. 2 is a view similar to FIG. 1 in which the read head is positioned to read contributions from a track of interest and only one additional track.

FIG. 1 shows a simplified schematic view of four shingled data tracks 101, 102, 103, 104, with a read-head 105 wider than the track pitch. Track 101 is written first, followed by track 102, 103, etc. Because the tracks are written in a shingled manner, track 102, e.g., partially overwrites information written on track 101. Track pitch is now limited by the size of read head 105—if the read head width is wider than the track pitch, read head 105 will pick up significant signal components from one or more adjacent tracks 101, 103 as indicated at 115 and 125, making it more difficult to demodulate data from the current track 102. As shown in FIG. 2, one possible way to deal with ITI is to use decisions from adjacent track to cancel ITI in the current track, by positioning read head 105 so that substantially all contributions to ITI come from a single track adjacent to the track of interest, as opposed two adjacent tracks as in FIG. 1.

Assuming that the tracks are read in the same order 101, 102, 103, 104, etc., in which they were written, as indicated by arrow A, then during the reading and decoding of track k (103), the hard disk controller may provide a read-back signal corresponding to the data on track k−1(102), which has been read previously. The read-back information may used to cancel the ITI contribution to track k (103) from track k−1(102).

Figure 3:
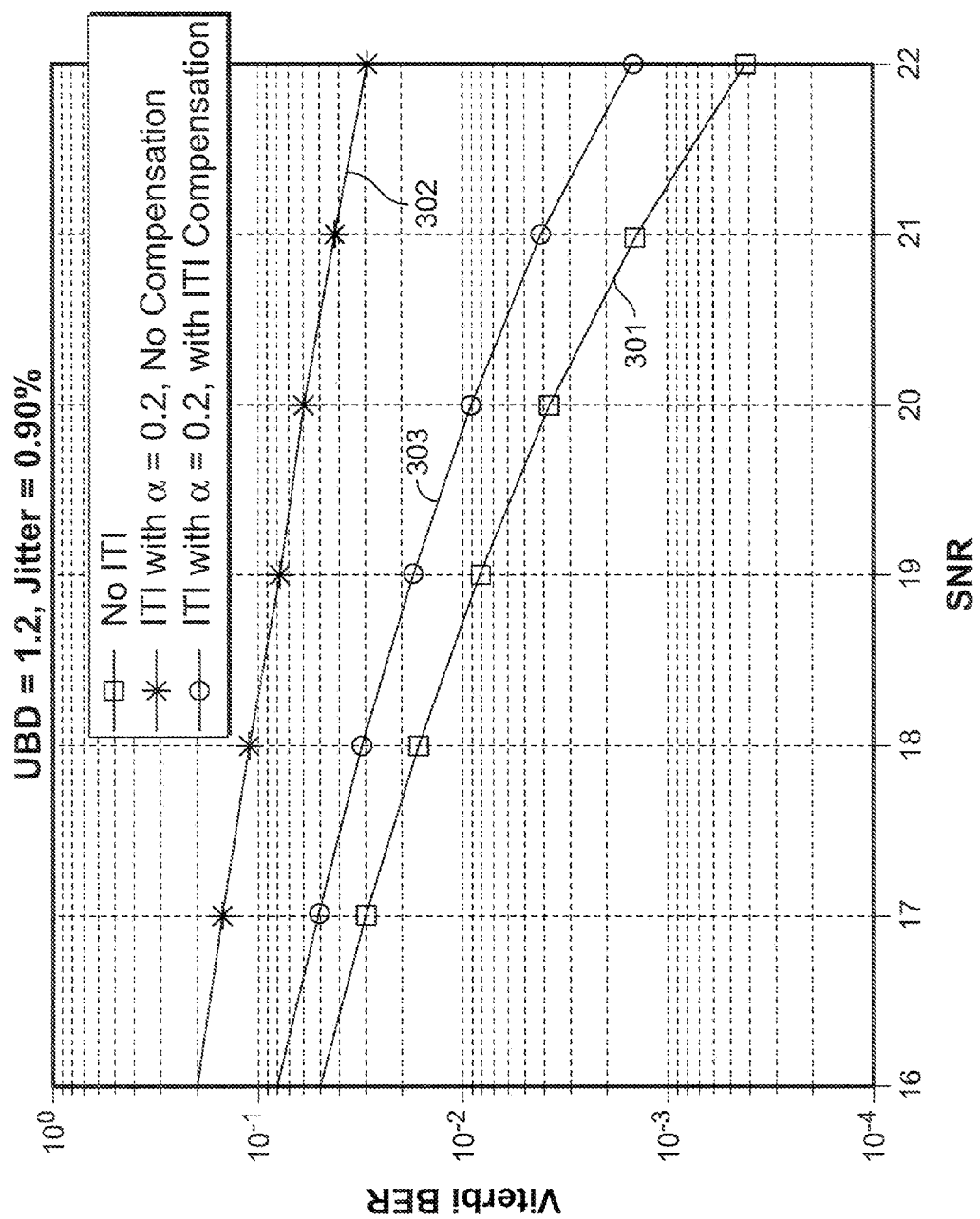
FIG. 3 is a graphical representation of the effects of ITI and ITI compensation on a signal.

The presence of even 10% ITI from an adjacent track, can lead to a significant performance degradation, unless ITI cancellation is applied. Curve 301 in FIG. 3 shows the bit error rate in a decoded signal as a function of signal-to-noise ratio in the absence of ITI, while curve 302 shows the same signal with uncompensated ITI, where, in FIG. 2, α=0.2 (i.e., in FIG. 2 20% of the signal picked up by read-head 105 comes from adjacent track k−1(102)). Curve 303, which shows the same signal with ITI compensation according to an embodiment of the disclosure, is much closer to curve 301 than to curve 302 as most of the ITI has been removed.

Such a correction technique, one example of which is described in above-incorporated application Ser. No. 12/882,802, may involve pre-reading of the adjacent track and storage of the decoder decisions, which may require, in some implementations, a buffer large enough to hold a complete additional track's worth of data. This also may result, in some implementations, in a substantial reduction in read throughput in the case of a random data access mode—e.g., if the tracks are not read in order, then to read each track, an adjacent track must be read first, resulting in a 50% throughput reduction.

Figure 4:
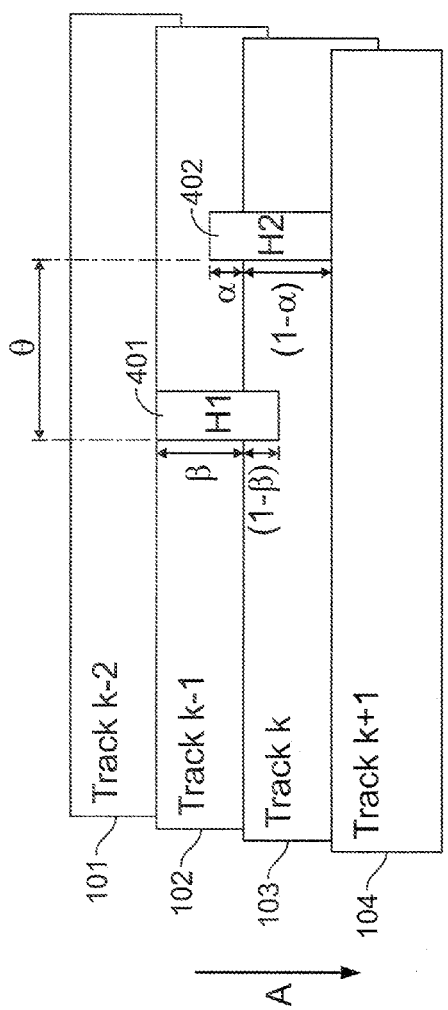
FIG. 4 shows an arrangement of read heads in accordance with an embodiment of the disclosure.

FIG. 4 shows an arrangement according to an embodiment of the present disclosure in which an array of two or more read heads is used to read the data. In the arrangement of FIG. 4, there are two read heads H1, H2 (401, 402), but the disclosure may be generalized to any number of read heads greater than or equal to two. In general, as the track pitch decreases relative to the size of the read head, so that the number of tracks spanned by each read head increases, the number of read heads used can be expected to increase accordingly.

If the direction of storage medium movement is indicated by arrow B in FIG. 4, then a particular location on the track medium will be read first by read head H2 (402) and then sometime later will reach read head H1 (401). If $y^{(1)}$ and $y^{(2)}$ are the signal components from the track of interest k−1(102) and the adjacent track k (103), respectively, then the signal $Y^{(2)}$ picked up by the read head H2 (402) can be written as:

$$Y^{(2)} = \alpha y^{(1)} + (1-\alpha) y^{(2)}$$

and the signal $Y^{(1)}$ picked up by the second read head H1 (401) can be written as:

$$Y^{(1)} = \beta y^{(1)} + (1-\beta) y^{(2)}.$$

The objective is to solve for the signal component $y^{(1)}$ representing the track of interest k−1(102). Using linear algebraic notation, the foregoing two equations may be written:

$$\begin{bmatrix} y^{(2)} \\ y^{(1)} \end{bmatrix} = \begin{bmatrix} \alpha & 1-\alpha \\ \beta & 1-\beta \end{bmatrix} \begin{bmatrix} y^{(1)} \\ y^{(2)} \end{bmatrix}$$

Solving for $y^{(1)}$, $y^{(2)}$ yields:

$$\begin{bmatrix} y^{(1)} \\ y^{(2)} \end{bmatrix} =$$

$$\begin{bmatrix} \alpha & 1-\alpha \\ \beta & 1-\beta \end{bmatrix}^{-1} \begin{bmatrix} y^{(2)} \\ y^{(1)} \end{bmatrix} = \frac{1}{\alpha(1-\beta)-\beta(1-\alpha)} \begin{bmatrix} \alpha & -\beta \\ \alpha-1 & 1-\beta \end{bmatrix} \begin{bmatrix} y^{(2)} \\ y^{(1)} \end{bmatrix} =$$

$$\frac{1}{\alpha-\beta} \begin{bmatrix} \alpha & -\beta \\ \alpha-1 & 1-\beta \end{bmatrix} \begin{bmatrix} y^{(2)} \\ y^{(1)} \end{bmatrix}$$

For demodulating $y^{(1)}$, this would suggest an ITI cancellation filter of the form:

$$F_{ITI} = \frac{1}{\alpha-\beta}[\alpha, -\beta].$$

This is known as a Zero-Forcing (ZF) solution for the ITI filter taps, because it does not take noise into account. A ZF solution for ITI suffers from noise boosting, and does not provide good performance. A better solution would be a least-mean-square solution as described below.

The foregoing example illustrates the case where each read head overlaps two tracks—one track of interest and one adjacent track that contributes ITI. Such a system can be solved using two equations in two unknowns as shown above. It will further be appreciated that by using additional heads, systems of multiple equations in multiple unknowns may be solved. Thus, as track widths become narrower, and each read head covers multiple tracks, the number of heads can be increased. Moreover, if two-dimensional encoding/decoding is used over multiple tracks, a multiple-head embodiment of the present disclosure can be used.

Figure 5:
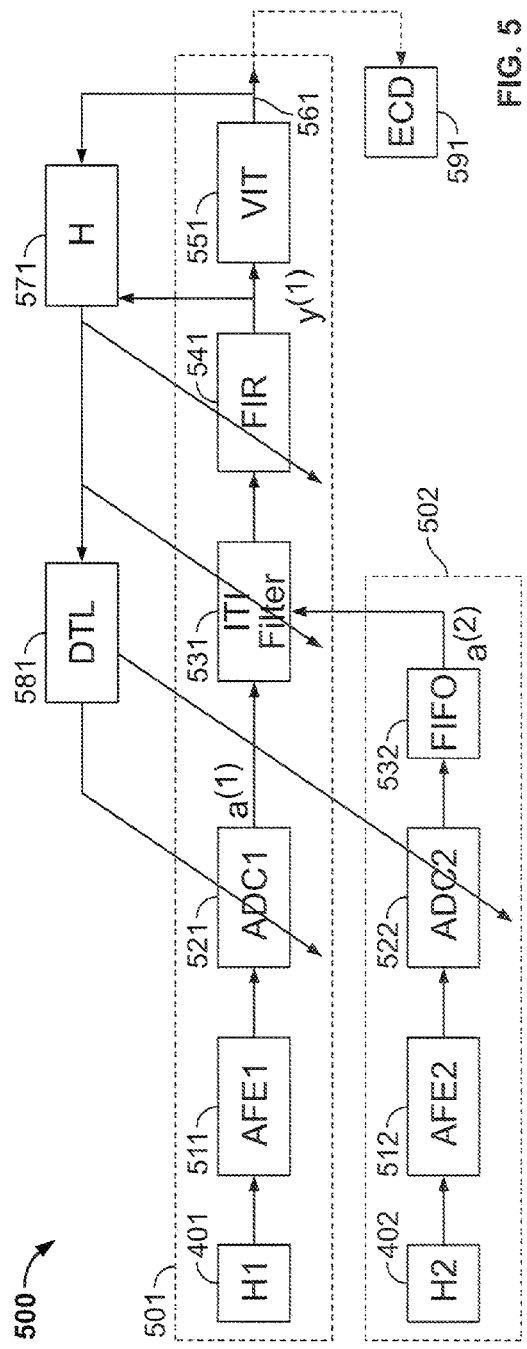
FIG. 5 is a schematic view of a first decoder architecture in accordance with an embodiment of the disclosure.

FIG. 5 schematically shows a first architecture 500 of the decoder channels 501, 502 for the two read heads H1, H2 (401, 402). Each channel 501, 502 may have its own respective analog front end (AFE) 511, 512 and analog-to-digital converter (ADC) 521, 522. In the system shown in FIG. 4, it is assumed that the track that is being decoded is track k−1, i.e., the track contributing most of the signal to picked up by read head H1 (401), while read head H2 (402) primarily picks up information from adjacent, interfering track k. Therefore, downstream of analog-to-digital converter 522, channel 502 has a FIFO delay line 532 whose purpose will be discussed below, which feeds ITI cancellation filter 531 that operates on the signal from analog-to-digital converter 512 in according with the filtering technique discussed above. The output of read head H2 (402) is not further processed in this embodiment.

The output of ITI filter 531 is filtered, e.g. by FIR filter 541 and then provided as an input to Viterbi detector (VIT) 551. Depending on the channel architecture, Viterbi detector decisions can be sent to an Error Correction Decoder Module (ECD) 591, or can be sent along with FIR samples to some other block, such as a data-dependent Viterbi detector or Soft-Output_Viterbi Algorithm (SOVA) module if iterative error correction codes are used. Additionally, Viterbi decisions can be provided to channel reconstructive filter (H) 571. Reconstructed noiseless channel samples are then used to drive digital timing loop (DTL) 581 to provide timing signals for the two analog-to-digital converters 521, 522 and to adapt ITI and FIR filters 531, 541. Note that sampling instances for the signal coming from read head (H2) 402 is determined by minimizing the noise in the signal $y^{(1)}$ representative of the data written on track k−1, rather than by minimizing the noise in the signal $y^{(2)}$, which is the primary component read by read head (H2) 402 representative of the data on adjacent track k, although for track 502 this may be adjusted as described below. Because we are only interested in demodulating track k−1 (102) as opposed to track k (103), the analog-to-digital converter should be driven to choose sampling points minimizing the noise in signal $y^{(1)}$. On the other hand, the signal picked up by read head (H2) 402 should be sampled at the same signal points as sampled by read head (H1) 401 to be able to cancel contribution of the adjacent track k from the signal $Y^{(1)}$ picked up by read head (H1) 401. Therefore the timing for read head H2 (402) is driven by the timing recovery based on ITI-compensated FIR samples corresponding to track k−1 (103).

A zero-forcing solution for the ITI cancellation filter 531 such as that described above may suffer from noise boosting, leading to suboptimal performance. A better adaptation method for ITI filter taps may be based on minimizing squared error:

$$\min_{(I_0, I_1)} [(I_0 a^{(1)} + I_1 a^{(2)}) F - \bar{y}^{(1)}]^2$$

leading to:

$$I_0(k) = I_0(k-1) - \mu_0 e(a^{(1)} F)$$

$$I_1(k) = I_1(k-1) + \mu_1 e(a^{(2)} F)$$

where $$e = (I_0 a^{(1)} + I_1 a^{(2)}) F - \bar{y}^{(1)}$$

and $\mu_0$ and $\mu_1$ are damping constants and may be the same or different.

Remembering that the movement of the storage medium is indicated by arrow B in FIG. 4, that means that any particular portion of the storage medium will be read by read head H2 (402) before it is read by read head H1 (401). That means that there will be a phase offset $\theta$ between the signals from read heads H1, H2 (401, 402). This phase offset, whether measured in terms of phase angle or number of bit storage positions, can be broken down into an integer portion $\theta_I$ (i.e., an integer number of phase angle units or of bit positions) and a fractional portion $\theta_R$ (i.e., a fractional number of phase angle units or of bit positions).

The integer portion $\theta_I$ of the phase offset can be accounted for by FIFO delay line 532. The fractional portion $\theta_R$ of the phase offset may be used to delay sampling by analog-to-digital converter 522 from the timing indicated by digital timing loop filter 581. The value of $\theta$ can change from one track from another, and may be calibrated during manufacturing. After calibration ADC2 522 will be set up to sample a phase offset $\theta_R$ with respect to ADC1 521. Digital timing loop filter 581, can provide some fine adjustment to this setting.

For example, in the foregoing synchronous sampling implementation, digital timing loop filter 581 can be configured to minimize a cost function based on the two sample components to determine the two sampling phases. However, because the second sampling phase is related to the first sampling phase by the phase offset $\theta_R$, this problem can be reduced to solving for only one sampling phase $\theta_S$. Thus, if $y^{(1)}$ is the output of FIR filter 541:

$$y^{(1)} = (I_0 a^{(1)}(kT + \theta_S) F + I_1 a^{(2)}(kT + \theta_{S2}) F)$$

Because $\theta_{S2} = \theta_S + \theta_R$, this can be written as $$y^{(1)} = (I_0 a^{(1)}(kT + \theta_S) F + I_1 a^{(2)}(kT + \theta_S + \theta_R) F)$$

and the cost function can be minimized solely as function of $\theta_S$, without regard to $\theta_{S2}$:

$$\min_{\theta_S}[y^{(1)}(kT+\theta_S)-\bar{y}^{(1)}]^2$$

As one example, the cost function could be minimized using a minimum mean square error (MMSE) update function:

$$\theta_{Sk}=\theta_{S(k-1)}-\mu e_k\left.\frac{\partial y^{(1)}}{\partial t}\right|_{kT+\theta_{S(k-1)}}$$

The phase offset between the two analog-to-digital converters could vary over time—e.g., as a function of temperature. Therefore, in a further variant of a synchronous sampling implementation, the timing loop can be updated to track those variations. In one example of such a case, the goal would be to minimize the following cost function:

$$\min_{\Delta}[I_0a^{(1)}(kT+\theta_S)F+I_1a^{(2)}(kT+\theta_S+\Delta)F-\bar{y}^{(1)}]^2$$

where the value of $\Delta$ is initialized to the calibrated phase offset $\theta_R$ and updated according to the following MMSE update function:

$$\Delta_k=\Delta_{k-1}-\mu e_k\left.\frac{\partial(I_1a^{(2)}F)}{\partial t}\right|_{kT+\theta_{S(k-1)}+\Delta_{k-1}}$$

The gain control for the second read head cannot be decision-based because it is providing an adjacent-track signal to aid in making decisions about the first read head, but no decisions are made regarding the signal from the second read head. However that does not matter precisely because the signal from the second read head is not being demodulated. Therefore, envelope-based gain control may be used.

While the foregoing synchronous sampling architecture operates reasonably well during tracking mode, during acquisition mode (at the beginning of each sector) there is no timing information available for second read head H2 (402), which is flying ahead of first read head H1 (401). Therefore, second read head H2 (402) samples asynchronously during that time. According to one embodiment, digital interpolation may be used to re-sample the read-back signal from second read head H2 (402) at times that are synchronous with the samples from first read head H1 (401)

Figure 6:
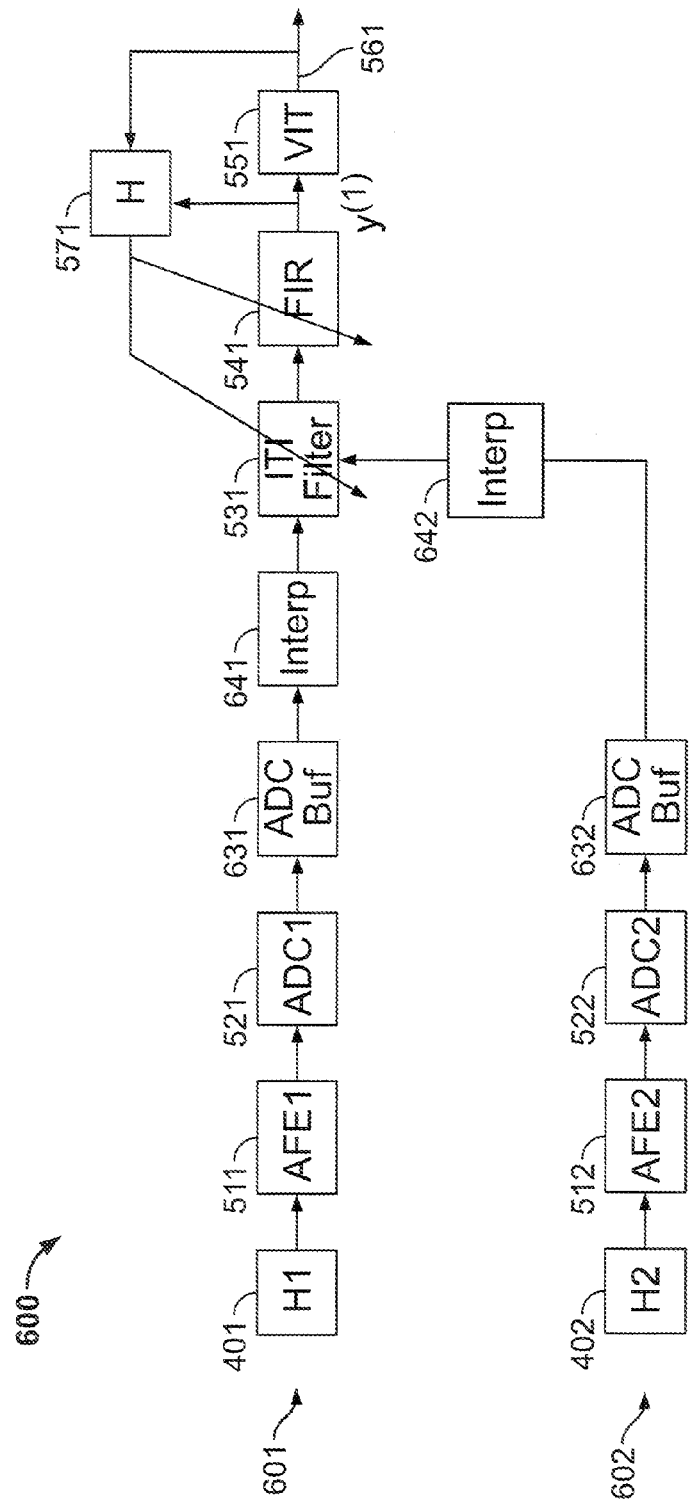
FIG. 6 is a schematic view of a second decoder architecture in accordance with an embodiment of the disclosure.

In another implementation 600, shown in FIG. 6, the two analog-to-digital converters are driven by the same clock and therefore are sampled synchronously in time, but the sampling points of the two signals may be asynchronous. In this implementation, interpolated timing recovery may be used on the signals from both read heads H1, H2 (401, 402). As long as the asynchronous sampling frequency is slightly higher than the Nyquist frequency (i.e., slightly higher than the bit rate), digital interpolation will be able to extract the desired samples.

In implementation 600 of FIG. 6, each channel 601, 602 may have its own respective analog front end (AFE) 511, 512 and analog-to-digital converter (ADC) 521, 522. The output of the respective ADC 521, 522 is buffered at 631, 632, and digital interpolators 641, 642 extract the respective samples for ITI cancellation filter 531. Buffer 632 may also account for the integer phase difference $\theta_I$, or a separate delay line 532 may be used as discussed above in connection with FIG. 5, while $\theta_R$ is calculated as in the implementation of FIG. 5.

Figure 7:
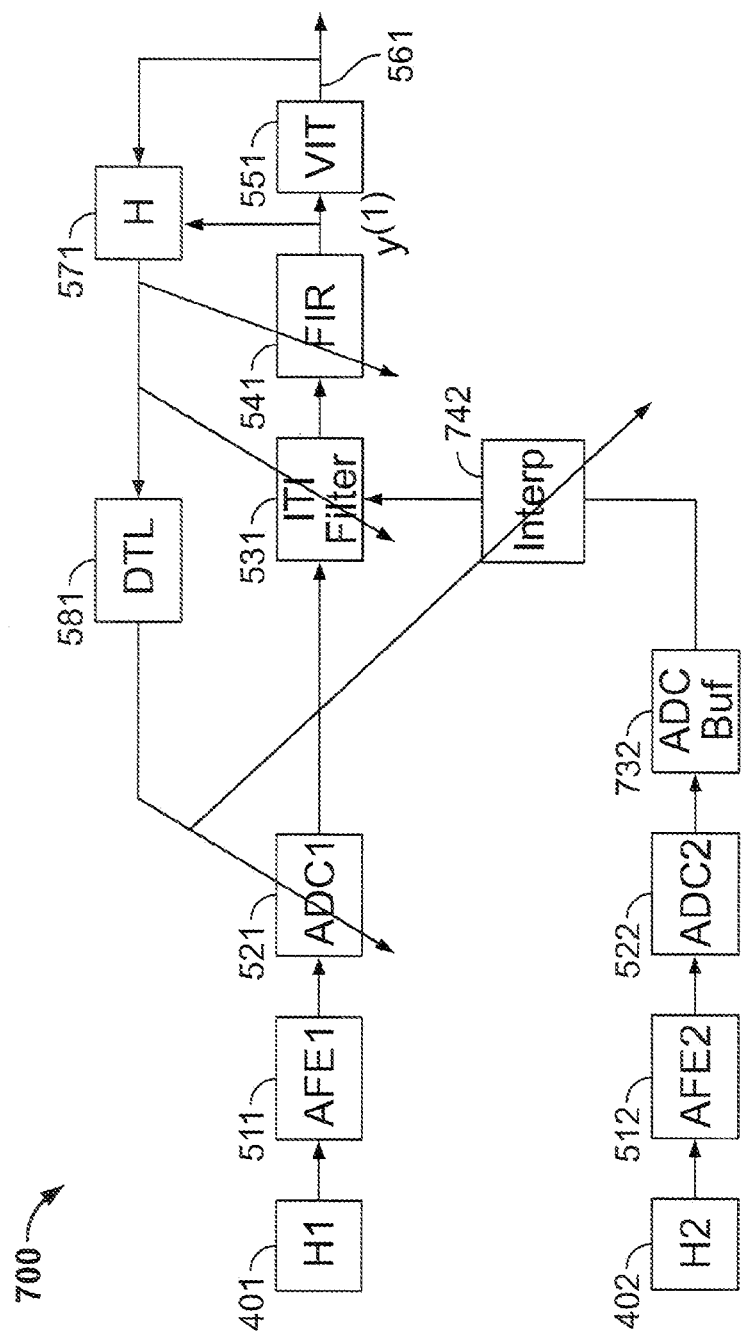
FIG. 7 is a schematic view of a third decoder architecture in accordance with an embodiment of the disclosure.

In a further implementation 700 shown in FIG. 7, a hybrid approach may be used. That is, a digital timing loop filter 581 may be provided to control synchronous sampling of the output of read head H1 (401) as in the implementation of FIG. 5, while the output of read head H2 (402) may be sampled asynchronously as in implementation 600 of FIG. 6. As discussed above in connection with FIG. 6, the description of sampling as "synchronous" or "asynchronous" is in relationship to the signal coming from the respective track. However the relationship between sampling clock of ADC1 and ADC2 is assumed to be known. The asynchronous samples may be buffered at 732, and the buffered signal can be interpolated by digital interpolator 742 to extract interpolated samples at times dictated by digital timing loop filter 581. And again, buffer 732 may also account for the integer phase difference $\theta_I$, or a separate delay line 532 may be used as discussed above in connection with FIG. 5, while $\theta_R$ is calculated as in the implementation of FIG. 5.

It will appreciated that the aforementioned lack of samples for read head H2 (402) during acquisition is taken care of inherently in implementations 600 and 700 by the asynchronous sampling of at least that head.

Figure 8:
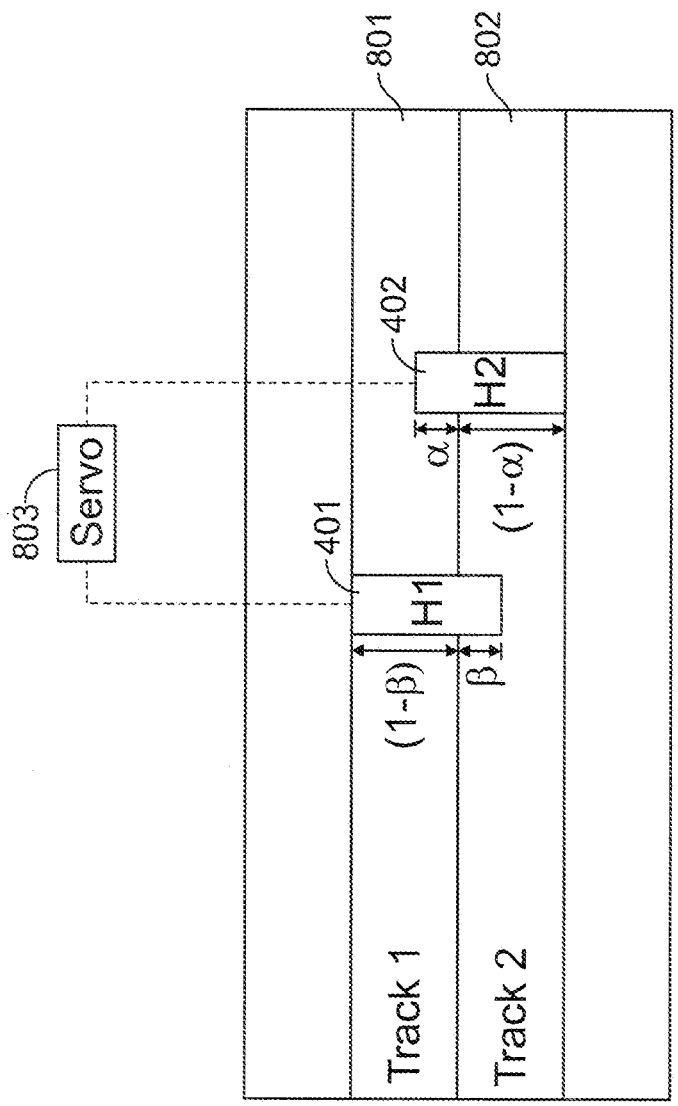
FIG. 8 shows an arrangement of read heads similar to FIG. 4, illustrating control of head position in accordance with an embodiment of the disclosure.

Another advantage that may be derived from using two (or more) read heads, each predominantly sampling a different track, is that the signals from the different heads can be used as a separate source of head position information, in addition to the servo information previously available. For example, as seen in FIG. 8 (similar to FIG. 4 above), if read head H1 (401) is supposed to be aligned to the edge of Track 1 (801) and partially overlap Track 2 (802), then the portion of read head H1 (401) that overlaps Track 2 (802) may be designated β and the portion of read head H1 (401) that overlaps Track 1 (801) may be designated 1−β. Similarly, the portion of read head H2 (402) that overlaps Track 1 (801) may be designated α and the portion of read head H2 (402) that overlaps Track 2 (802) may be designated 1−α.

It will be appreciated that if the widths of Track 1 (801) and Track 2 (802) are substantially identical, then regardless of the widths of read head H1 (401) and read head H2 (402), if each read head is in its intended alignment, the encroachment α of read head H2 (402) that overlaps Track 1 (801) should be minimized for best performance, but would not necessarily be zero. This is due, at least in part, to the fact that both heads H1 (401) and H2 (402) are usually mounted on the same arm and cannot be moved independently. Therefore, the relationship between the portions α and β should be α=β+C, where C is a positive or negative constant that may be determined by calibration and, in an ideal case, may be equal to zero. As part of the ITI cancellation technique described above, the parameters α and β can be derived, and fed to the head-positioning servo mechanism 803, which can adjust the positions of read head H1 (401) and read head H2 (402) as necessary to maintain, as closely as possible, α=β+C.

In other implementations, other relationships between α and β may apply.

Thus it is seen that a data storage system, and method of decoding stored data, including various architectures for sampling contributions from one or more adjacent tracks, which may then be accounted for in decoding one or more tracks of interest, have been provided.

It will be understood that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method for sampling a current track of a storage medium and an adjacent track of the storage medium, the method comprising:
   using a first read head to read a first data stream from the current track;
   using a second read head to read a second data stream from the adjacent track;
   delaying one of the first data stream and the second data stream to account for a position difference between the first read head and the second read head; and
   controlling sampling of the first data stream and the second data stream to align the first data stream and the second data stream.

2. The method of claim 1 wherein the controlling sampling comprises applying a synchronous sampling signal to control the first read head and the second read head so that they sample at synchronous locations in their respective data streams.

3. The method of claim 2 further comprising:
   processing the first data stream and the second data stream to derive timing information and data from the first data stream; and
   deriving the synchronous sampling signal from the timing information.

4. The method of claim 1 wherein the controlling sampling comprises:
   sampling the current track with the first read head, and the adjacent track with the second read head, at asynchronous locations to provide the first and second data streams; and
   interpolating the first data stream and the second data stream to provide aligned samples of the first and second data streams.

5. The method of claim 4 wherein:
   the first and second data streams are synchronously clocked and have a bit rate; and
   the sampling the current track with the first read head and the adjacent track with the second read head comprises sampling the current and adjacent data tracks at a sampling frequency higher than the bit rate.

6. The method of claim 1 wherein the controlling timing comprises:
   applying a timing signal to control sampling by the first read head to provide the first data stream;
   sampling the adjacent track with the second read head, at sampling locations asynchronous to the first read head, to provide the second data stream; and
   interpolating the second data stream under control of the timing signal to provide samples of the second data stream aligned with samples of the first data stream.

7. The method of claim 6 further comprising:
   processing the first data stream and the second data stream to derive timing information and data from the first data stream; and
   deriving the timing signal from the timing information.

8. The method of claim 6 wherein:
   the first and second data streams have a bit rate; and
   the first and second read heads sample the current and adjacent tracks at a sampling frequency higher than the bit rate.

9. A storage device comprising:
   a first read head that reads a first data stream from a current track of a storage medium;
   a second read head that reads a second data stream from an adjacent track of the storage medium; and
   a decoder that:
   delays one of the first data stream and the second data stream to account for a position difference between the first read head and the second read head; and
   controls sampling of the first data stream and the second data stream to align the first data stream and the second data stream.

10. The storage device of claim 9 wherein the decoder controls the sampling by applying a synchronous sampling signal to control the first read head and the second read head so that they sample at synchronous locations in their respective data streams.

11. The storage device of claim 10 wherein the decoder further:
   processes the first data stream and the second data stream to derive timing information and data from the first data stream; and
   derives the synchronous sampling signal from the timing information.

12. The storage device of claim 9 wherein the decoder controls the sampling by:
   sampling the current track with the first read head, and the adjacent track with the second read head, at asynchronous locations to provide the first and second data streams; and
   interpolating the first data stream and the second data stream to provide aligned samples of the first and second data streams.

13. The storage device of claim 12 wherein:
   the first and second data streams are synchronously clocked and have a bit rate; and
   the decoder samples the current track with the first read head and the adjacent track with the second read head by sampling each of the current and adjacent tracks at a sampling frequency higher than the bit rate.

14. The storage device of claim 9 wherein the decoder controls timing by:
   applying a timing signal to control sampling by the first read head to provide the first data stream;
   sampling the adjacent track with the second read head, at sampling locations asynchronous to the first read head, to provide the second data stream; and
   interpolating the second data stream under control of the timing signal to provide samples of the second data stream aligned with samples of the first data stream.

15. The storage device of claim 14 wherein the decoder further:
   processes the first data stream and the second data stream to derive timing information and data from the first data stream; and
   derives the timing signal from the timing information.

16. The storage device of claim 14 wherein:
   the first and second data streams have a bit rate; and
   the first and second read heads sample the current and adjacent tracks at a sampling frequency higher than the bit rate.

17. A method of controlling read head position in a storage device having a plurality of read heads, the method comprising:
   deriving a first parameter from a first read head that reads a first track of a plurality of tracks; and deriving a second parameter from a second read head that reads a second track of the plurality of tracks; wherein:

the first parameter represents a portion of a signal from the first read head attributable to overlap of the first read head over the second track; and the second parameter represents a portion of a signal from the second read head attributable to overlap of the second read head over the first track; the method further comprising:

controlling position of at least one of the read heads to achieve a desired relationship of the first and second parameters.

18. The method of claim 17 wherein:

the desired relationship is a predetermined relationship between the first and second parameters.

19. The method of claim 18 wherein the predetermined relationship is differing of the first and second parameters by a constant.

20. The method of claim 19 wherein the constant is zero.

* * * * *